(12) United States Patent
Miyamoto et al.

(10) Patent No.: US 12,508,793 B2
(45) Date of Patent: Dec. 30, 2025

(54) DAMPING LAMINATE

(71) Applicant: KURARAY PLASTICS CO., LTD., Osaka (JP)

(72) Inventors: Takehiro Miyamoto, Gifu (JP); Teruo Kitamura, Osaka (JP)

(73) Assignee: KURARAY PLASTICS CO., LTD., Osaka (JP)

( * ) Notice: Subject to any disclaimer, the term of this patent is extended or adjusted under 35 U.S.C. 154(b) by 251 days.

(21) Appl. No.: 18/260,279

(22) PCT Filed: Dec. 15, 2021

(86) PCT No.: PCT/JP2021/046300
§ 371 (c)(1),
(2) Date: Jul. 3, 2023

(87) PCT Pub. No.: WO2022/145235
PCT Pub. Date: Jul. 7, 2022

(65) Prior Publication Data
US 2024/0059045 A1    Feb. 22, 2024

(30) Foreign Application Priority Data

Jan. 4, 2021 (JP) ................................. 2021-000090

(51) Int. Cl.
*B32B 5/10* (2006.01)
*B32B 27/12* (2006.01)
*B32B 27/30* (2006.01)

(52) U.S. Cl.
CPC ................ *B32B 5/10* (2013.01); *B32B 27/12* (2013.01); *B32B 27/302* (2013.01); *B32B 2270/00* (2013.01); *B32B 2307/56* (2013.01)

(58) Field of Classification Search
CPC ........ B32B 27/30; B32B 27/302; C08L 25/00; C08L 25/02; C08L 25/04; C08L 25/08; C08L 25/10
See application file for complete search history.

(56) References Cited

U.S. PATENT DOCUMENTS

| 2013/0130584 A1 | 5/2013 | Fujiwara et al. |
| 2020/0010649 A1 | 1/2020 | Mori |
| 2020/0248033 A1 | 8/2020 | Miyamoto et al. |

FOREIGN PATENT DOCUMENTS

| EP | 2 980 153 | 2/2016 |
| JP | 2005-246882 | 9/2005 |
| JP | 2015-193751 | 11/2015 |
| JP | 2018-154827 | 10/2018 |
| JP | 2019-5955 | 1/2019 |
| WO | 2012/011487 | 1/2012 |
| WO | 2019/069684 | 4/2019 |

OTHER PUBLICATIONS

Masson et al., "Glass transitions and mixed phases in block SBS", Feb. 1, 2005, Journal of Polymer Science Part B: Polymer Physics, vol. 43, pp. 276-279 (Year: 2005).*
European Search Report received for European Patent Application No. 21915096.8, mailed on Sep. 19, 2024, 7 pages.
International Search Report dated Mar. 1, 2022, in PCT/JP2021/046300, with English translation, 5 pages.
Written Opinion dated Mar. 1, 2022, in PCT/JP2021/046300, with English translation, 8 pages.

* cited by examiner

*Primary Examiner* — Zachary M Davis
(74) *Attorney, Agent, or Firm* — Grüneberg and Myers PLLC

(57) ABSTRACT

A damping laminate includes a thermoplastic elastomer sheet containing a thermoplastic elastomer (a) containing at least one copolymer block (A) with a glass transition temperature of 30° C. or lower, and having a plurality of through holes; and a fiber-reinforced resin layer disposed on one surface or each of both surfaces of the thermoplastic elastomer sheet.

14 Claims, No Drawings

DAMPING LAMINATE

CROSS-REFERENCE TO RELATED APPLICATIONS

This application is the National Stage entry under § 371 of International Application No. PCT/JP2021/046300, filed on Dec. 15, 2021, and which claims the benefit of priority to Japanese Application No. 2021-000090, filed on Jan. 4, 2021. The content of each of these applications is hereby incorporated by reference in its entirety.

TECHNICAL FIELD

The present invention relates to a damping laminate.

BACKGROUND ART

A composite substrate (Patent Document 1) using a reinforcing fiber fabric and a hydrogenated product of a block copolymer of a vinyl aromatic compound and a conjugated diene-based compound is conventionally known.

In addition, a prepreg (Patent Document 2) containing a carbon-fiber-reinforced resin layer and a nonwoven fabric made of a thermoplastic elastomer and/or a polyolefin is also known.

PRIOR ART DOCUMENTS

Patent Documents

Patent Document 1: JP-A-2015-193751
Patent Document 2: WO2012/011487

SUMMARY OF THE INVENTION

Problems to be Solved by the Invention

However, in the composite substrate described in Patent Document 1, further improved rigidity and damping performance are sometimes required. In addition, the prepreg described in Patent Document 2 does not have sufficient damping performance according to the study by the present inventors.

A problem to be solved by the present invention is to provide a damping laminate that is extremely good in damping performance while having excellent interlayer adhesiveness and excellent rigidity.

Solutions to the Problems

As a result of intensive studies, the present inventors have found that the above problems can be solved by a laminate comprising a fiber-reinforced resin layer on one surface or each of both surfaces of a specific thermoplastic elastomer sheet, leading to the present invention.

That is, the present invention includes the following preferred embodiments.

[1] A damping laminate comprising:
a thermoplastic elastomer sheet comprising a thermoplastic elastomer (a) containing at least one copolymer block (A) with a glass transition temperature of 30° C. or lower, and having a plurality of through holes; and
a fiber-reinforced resin layer disposed on one surface or each of both surfaces of the thermoplastic elastomer sheet.

[2] The damping laminate according to [1], wherein the thermoplastic elastomer (a) contains at least one copolymer block (B) containing a structural unit derived from one or more compounds selected from the group consisting of a vinyl aromatic compound, an olefinic compound, a urethane compound, and an ester compound.

[3] The damping laminate according to [1] or [2], wherein the thermoplastic elastomer (a) is a block copolymer composed of at least one copolymer block (A) composed of a structural unit derived from a conjugated diene-based compound and at least two copolymer blocks (B) composed of a structural unit derived from a vinyl aromatic compound, and/or a hydrogenated product of the block copolymer.

[4] The damping laminate according to any one of [1] to [3], wherein the thermoplastic elastomer (a) has a weight average molecular weight of 40,000 or more and 500,000 or less.

[5] The damping laminate according to any one of [1] to [4], wherein
based on 100 parts by mass of the thermoplastic elastomer (a) in the thermoplastic elastomer sheet,
a content of a hydrocarbon-based softener (b) is 10 parts by mass or more and 300 parts by mass or less, and
a content of a polyolefin-based resin (c) is 50 parts by mass or less.

[6] The damping laminate according to any one of [1] to [5], wherein
based on 100 parts by mass of the thermoplastic elastomer (a) in the thermoplastic elastomer sheet,
a content of a hydrocarbon-based softener (b) is 10 parts by mass or more and 300 parts by mass or less, and
a content of a polyolefin-based resin (c) is 2 parts by mass or more and 50 parts by mass or less.

[7] The damping laminate according to any one of [1] to [6], wherein the thermoplastic elastomer sheet has an opening ratio of 5% or more and 80% or less.

[8] The damping laminate according to any one of [1] to [7], wherein the thermoplastic elastomer sheet has an average through hole diameter of 50 μm or more and 6,000 μm or less.

[9] The damping laminate according to any one of [1] to [8], wherein the thermoplastic elastomer sheet has a through hole density of 1 hole/cm$^2$ or more and 80 holes/cm$^2$ or less.

[10] The damping laminate according to any one of [1] to [9], wherein the fiber-reinforced resin layer contains one or more types of fiber selected from the group consisting of carbon fiber, silica fiber, glass fiber, aramid fiber, boron fiber, alumina fiber, and silicon carbide fiber.

Effects of the Invention

With the present invention, a damping laminate that is extremely good in damping performance while having excellent interlayer adhesiveness and excellent rigidity can be provided.

DETAILED DESCRIPTION

The damping laminate of the present invention comprises a thermoplastic elastomer sheet (hereinafter also referred to as a "perforated sheet") having a plurality of through holes, and a fiber-reinforced resin layer disposed on one side or each of both sides of the sheet.

In one embodiment of the present invention, the damping laminate consists of a perforated sheet and a fiber-reinforced resin layer disposed on one side or each of both sides of the sheet.

[Perforated Sheet]

The perforated sheet includes a thermoplastic elastomer (a), a hydrocarbon-based softener (b), optionally a polyolefin-based resin (c), and optionally an additive (d).

<Thermoplastic Elastomer (a)>

The thermoplastic elastomer (a) contained in the perforated sheet in the present invention contains at least one copolymer block (A) with a glass transition temperature of 30° C. or lower. The glass transition temperature in the present invention means a glass transition temperature measured by differential scanning calorimetry (DSC), and the measurement method is as described in the EXAMPLES section described later.

The thermoplastic elastomer (a) contained in the perforated sheet may be a single type of thermoplastic elastomer or may be a combination of two or more types, for example, having different types or contents of copolymer blocks, weight average molecular weights, and/or hydrogenation rates.

The glass transition temperature of the copolymer block (A) is preferably 27° C. or lower, more preferably 25° C. or lower, and preferably −45° C. or higher, more preferably −42° C. or higher, further preferably −40° C. or higher. The glass transition temperature of the copolymer block (A) can be adjusted to fall within a desired range by, for example, selecting the stereoregularity of the copolymer block (A). The glass transition temperature of the copolymer block (A) can be measured by the method described in the EXAMPLES section.

Since the thermoplastic elastomer (a) contains at least one copolymer block (A), the thermoplastic elastomer (a) has a large tangent loss (hereinafter also referred to as "tan δ") around room temperature, whereby extremely high damping performance can be imparted to the damping laminate of the present invention. Even if a perforated sheet similar to that of the present invention is produced using a thermoplastic elastomer not containing the copolymer block (A), and a laminate similar to that of the present invention is produced, it is difficult to solve the problem of the present invention.

Examples of the copolymer block (A) include a block containing a structural unit derived from a conjugated diene-based compound such as butadiene, isoprene, 2,3-dimethyl-1,3-butadiene, 1,3-pentadiene, 1,3-hexadiene, and chloroprene. The copolymer block (A) is preferably a block composed of a structural unit derived from a conjugated diene-based compound. Examples of the block containing a structural unit derived from the conjugated diene-based compound include a homopolymer block obtained from one conjugated diene-based compound, a random copolymer block, a block copolymer block, and a graft copolymer block, which are composed of two or more conjugated diene-based compounds; and a polymer block containing the homopolymer block or the copolymer block in its structure. Among them, the homopolymer block and the copolymer block are preferable. As the conjugated diene-based compound, butadiene, isoprene, and a mixture thereof are preferable.

The content of the copolymer block (A) in the thermoplastic elastomer (a) is not particularly limited. From the viewpoint of easily obtaining the flexibility and desired damping performance of the damping laminate, the content is preferably 40 mass % or more, more preferably 45 mass % or more, still more preferably 50 mass % or more, particularly preferably 60 mass % or more, and is preferably 95 mass % or less, more preferably 90 mass % or less, still more preferably 85 mass % or less, particularly preferably 80 mass % or less, based on the mass of the thermoplastic elastomer (a). The contents of the copolymer block (A) and a copolymer block (B) described later in the thermoplastic elastomer (a) can be measured by, for example, nuclear magnetic resonance ($^1$H-NMR, $^{13}$C-NMR).

Ina preferred embodiment, the thermoplastic elastomer (a) contains at least one copolymer block (B) in addition to the copolymer block (A). Examples of the copolymer block (B) include a block containing a structural unit derived from one or more compounds selected from the group consisting of a vinyl aromatic compound, an olefinic compound, a urethane compound, and an ester compound, and the copolymer block (B) is preferably a block composed of a structural unit derived from the compound. Among them, the copolymer block (B) is preferably a block composed of a structural unit derived from a vinyl aromatic compound.

Examples of the vinyl aromatic compound include styrene, α-methylstyrene, 1-vinylnaphthalene, 2-vinylnaphthalene, 3-methylstyrene, 4-propylstyrene, 4-cyclohexylstyrene, 4-dodecylstyrene, 2-ethyl-4-benzylstyrene, and 4-(phenylbutyl)styrene. The vinyl aromatic compound may be used singly or in combination of two or more kinds thereof. Styrene is most preferred.

Examples of the olefinic compound include ethylene, propylene, and 1-butene. The olefinic compound may be used singly or in combination of two or more kinds thereof. The olefinic compound is preferably ethylene or propylene, more preferably propylene.

Examples of the urethane compound include a reaction product of an aliphatic, cycloaliphatic, araliphatic, or aromatic isocyanate with a polyol having a number/weight average molecular weight of 400 to 10,000. The urethane compound may be used singly or in combination of two or more kinds thereof. The isocyanate is preferably an aliphatic polyisocyanate, of which hexamethylene diisocyanate (HDI) or heptamethylene diisocyanate (PDI) is preferred.

Examples of the ester compound include an ester compound of an aromatic dicarboxylic acid and an aliphatic or alicyclic diol. The ester compound may be used singly or in combination of two or more kinds thereof. The ester compound is preferably butylene naphthalate (ester of 2,6-naphthalenedicarboxylic acid and 1,4-butanediol) and butylene terephthalate (ester of terephthalic acid and 1,4-butanediol), more preferably butylene terephthalate.

When the thermoplastic elastomer (a) contains the copolymer block (B), the content of the copolymer block (B) in the thermoplastic elastomer (a) is not particularly limited. From the viewpoint of easily obtaining the flexibility and desired damping performance of the damping laminate, the content is preferably 5 mass % or more, more preferably 8 mass % or more, still more preferably 10 mass % or more, particularly preferably 15 mass % or more, and is preferably 60 mass % or less, more preferably 55 mass % or less, still more preferably 50 mass % or less, particularly preferably 45 mass % or less, based on the mass of the thermoplastic elastomer (a).

The thermoplastic elastomer (a) preferably contains at least one copolymer block (A) and at least two copolymer blocks (B) from the viewpoint of damping performance, flexibility, heat resistance, and mechanical properties. The bonding mode between the copolymer block (A) and the copolymer block (B) may be linear, branched, or any combination thereof. When the copolymer block (A) is represented by A and the copolymer block (B) is represented by B, the thermoplastic elastomer (a) preferably has a triblock structure represented by B-A-B or a multiblock structure represented by (A-B)$_n$ and (B-A)$_n$-B (where n represents an integer of 2 or more) from the viewpoint of easily obtaining desired damping performance, more preferably has a triblock structure from the viewpoint of easily obtaining heat resistance, mechanical properties, antifouling performance, and handleability in addition to the desired damping performance.

In a preferred embodiment, the thermoplastic elastomer (a) is a block copolymer composed of at least one copolymer block (A) composed of a structural unit derived from a conjugated diene-based compound and at least two copolymer blocks (B) composed of a structural unit derived from a vinyl aromatic compound, and/or a hydrogenated product of the block copolymer.

When the thermoplastic elastomer (a) contains a copolymer block (A) containing a structural unit derived from isoprene and/or butadiene, the content (hereinafter also referred to as "vinyl bond content") of the 3,4-bond unit and the 1,2-bond unit in the structural unit derived from isoprene and/or butadiene is preferably 5 mol % or more based on the total structural units derived from isoprene and butadiene from the viewpoint of easily obtaining impact absorbability and/or desired damping performance. The vinyl bond content is more preferably 10 mol % or more, still more preferably 15 mol % or more, and is usually 80 mol % or less, more preferably 75 mol % or less, still more preferably 70 mol % or less.

The vinyl bond content can be determined from a measured value obtained by measuring the contents of 3,4-bond unit and 1,2-bond unit in the structural unit derived from isoprene and/or butadiene by iodine value measurement, with an infrared spectrophotometer (IR), by nuclear magnetic resonance ($^1$H-NMR, $^{13}$C-NMR), or the like.

From the viewpoint of heat resistance, light resistance, or weather resistance, in the thermoplastic elastomer (a), 50 mol % or more of carbon-carbon double bonds derived from the conjugated diene-based compound of the copolymer block (A) is preferably hydrogenated. The hydrogenation rate is more preferably 75 mol % or more, still more preferably 95 mol % or more, particularly preferably 98 mol % or more, and is usually 100 mol % or less, for example, 99 mol % or less. The hydrogenation rate can be measured by iodine value measurement, with an infrared spectrophotometer (IR), by nuclear magnetic resonance ($^1$H-NMR, $^{13}$C-NMR), or the like.

The weight average molecular weight of the thermoplastic elastomer (a) is preferably 40,000 or more, more preferably 50,000 or more, particularly preferably 70,000 or more, and is preferably 500,000 or less, more preferably 400,000 or less, particularly preferably 350,000 or less, from the viewpoint of easily obtaining formability, flexibility, and mechanical properties of the perforated sheet. The weight average molecular weight in the present invention means a weight average molecular weight in terms of standard polystyrene determined by gel permeation chromatography (GPC) measurement.

The peak temperature of tan δ of the thermoplastic elastomer (a) is preferably −60° C. or higher, more preferably −50° C. or higher, particularly preferably −45° C. or higher, and is preferably 40° C. or lower, more preferably 35° C. or lower, particularly preferably 30° C. or lower. In the vicinity of the peak temperature of tan δ, high damping performance can be imparted to the damping laminate. The peak temperature of tan δ can be adjusted to a desired value by adjusting the content of the copolymer block (B) in the thermoplastic elastomer (a) or by adjusting the type, bonding form, glass transition temperature, or the like of the monomer constituting the copolymer block (A) or the copolymer block (B). The peak temperature of tan δ can be measured by the method described in the EXAMPLES section described later.

The thermoplastic elastomer (a) can be produced by, for example, methods described in JP-A-2014-218764, WO2011/040586, and the like but is not particularly limited to these production methods. Some examples of such production methods are described below.

The thermoplastic elastomer (a) can be produced by, for example, a polymerization method such as an ionic polymerization method such as anionic polymerization and cationic polymerization, a single-site polymerization method, and a radical polymerization method. In the case of producing a block copolymer consisting of at least one copolymer block (A) composed of a structural unit derived from the conjugated diene-based compound and at least two copolymer blocks (B) composed of a structural unit derived from the vinyl aromatic compound by an anionic polymerization method, for example, a block copolymer having a desired molecular structure and molecular weight can be produced by sequentially polymerizing the vinyl aromatic compound and the conjugated diene-based compound in an organic solvent inert to a polymerization reaction, such as n-hexane and cyclohexane, using an alkyllithium compound or the like as a polymerization initiator, and then adding an active hydrogen compound such as an alcohol, a carboxylic acid, and water to stop the polymerization. The polymerization is usually carried out at a temperature of 0 to 80° C. for 0.5 to 50 hours.

In the case of producing a hydrogenated product of the block copolymer, the hydrogenated product of the block copolymer can be produced by subjecting the produced block copolymer to a hydrogenation reaction in the presence of a hydrogenation catalyst in an organic solvent inert to a polymerization reaction after isolation or preferably without isolation of the block copolymer.

When an alkyllithium compound is used as the polymerization initiator, examples of such an alkyllithium compound include an alkyllithium compound having an alkyl group having 1 to 10 carbon atoms. Among them, methyllithium, ethyllithium, butyllithium, and pentyllithium am preferable. The amount of the polymerization initiator such as the alkyllithium compound to be used is preferably about 0.01 to 0.2 parts by mass based on 100 parts by mass of the total monomers to be used for polymerization.

In the block copolymer, which is the thermoplastic elastomer (a), in order to set the content of the 3,4-bond unit and/or the 1,2-bond unit derived from isoprene and/or butadiene to a desired content, it is preferable to use a Lewis base as a co-catalyst during polymerization. Examples of the Lewis base include ethers such as dimethyl ether, diethyl ether, tetrahydrofuran (THF), and dioxane; glycol ethers such as ethylene glycol dimethyl ether and diethylene glycol dimethyl ether; amine-based compounds such as triethylamine, N,N,N',N'-tetramethylethylenediamine (TMEDA), and N-methylmorpholine; nitrogen-containing heterocyclic aromatic compound such as pyridine; sulfoxides such as dimethyl sulfoxide; and ketones such as acetone and methyl ethyl ketone. These Lewis bases may be used singly or in combination of two or more kinds thereof. Among them, ethers and amine-based compounds are preferable and THE and TMEDA are more preferable, as the Lewis base.

The amount of the Lewis base used is preferably about 0.1 to 1,000 mol, more preferably 0.1 to 100 mol, still more preferably 1 to 100 mol, based on 1 mol of lithium atoms in the alkyllithium compound. The vinyl bond content can be arbitrarily controlled by appropriately adjusting the content within this range.

<Hydrocarbon-Based Softener (b)>

The perforated sheet in the present invention contains a hydrocarbon-based softener (b) in addition to the thermoplastic elastomer (a). Examples of the hydrocarbon-based softener (b) include process oils such as paraffinic oil, naphthenic oil, and aromatic oil and liquid paraffin, and among them, process oils such as paraffinic oil and naphthenic oil are preferable. These may be used singly or in combination of two or more kinds thereof.

The production of the hydrocarbon-based softener (b) is not particularly limited, and for example, the hydrocarbon-based softener (b) can be produced by a conventional publicly-known method. Commercially available products may be used as the hydrocarbon-based softener (b), and representative examples thereof include Diana Process Oil PW series (paraffinic oil) manufactured by Idemitsu Chemical Industry Co., Ltd., Diana Process Oil NR series (naphthenic oil) manufactured by Idemitsu Chemical Industry Co., Ltd., and NOBEL Process Oil AB series (aromatic oil) manufactured by NIKKO OIL PRODUCTS, Inc.

The content of the hydrocarbon-based softener (b) is preferably 10 parts by mass or more, more preferably 12 parts by mass or more, particularly preferably 15 parts by mass or more, and preferably 300 parts by mass or less, more preferably 200 parts by mass or less, particularly preferably 100 parts by mass or less, based on 100 parts by mass of the thermoplastic elastomer (a) in the perforated sheet.

<Polyolefin-Based Resin (c)>

In one embodiment of the present invention, the perforated sheet in the present invention may contain a polyolefin-based resin (c) as necessary. The object of the present invention can be achieved to a higher degree by using the polyolefin-based resin (c). Examples of such a polyolefin-based resin (c) include propylene-based polymers and ethylene-based polymers. These may be used singly or in combination of two or more kinds thereof.

Examples of the propylene-based polymer include homopolypropylene and copolymers of other α-olefins and polypropylene, such as random polypropylene and block polypropylene. The stereoregularity is not particularly limited, and isotactic polypropylene, syndiotactic polypropylene, atactic polypropylene, or the like may be used. Among them, copolymers of other α-olefins and propylene (such as random copolymers and block copolymers) are preferable. Examples of the other α-olefins include ethylene and an α-olefin having 4 to 20 carbon atoms and include ethylene, 1-butene, 1-pentene, 1-hexene, 1-octene, and 4-methyl-1-pentene. The other α-olefins may be used singly or in combination of two or more kinds thereof.

Examples of the ethylene-based polymer include ethylene homopolymers such as low density polyethylene (LDPE), medium density polyethylene, and high density polyethylene (HDPE); and copolymers of other α-olefins and ethylene (such as random copolymers and block copolymers). Examples of the other α-olefins include an α-olefin having 3 to 20 carbon atoms such as propylene, 1-butene, 1-pentene, 1-hexene, 1-octene, and 4-methyl-1-pentene. The other α-olefins may be used singly or in combination of two or more kinds thereof. Specific examples thereof include ethylene/αolefin copolymers such as an ethylene/1-butene copolymer, an ethylene/1-hexene copolymer, an ethylene/1-heptene copolymer, an ethylene/1-octene copolymer, an ethylene/4-methyl-1-pentene copolymer, an ethylene/M-nonene copolymer, and an ethylene/1-decene copolymer.

The production of the polyolefin-based resin (c) is not particularly limited, and for example, the polyolefin-based resin (c) can be produced by a conventional publicly-known method. Commercially available products may be used as the polyolefin-based resin (c), and representative examples thereof include Prime Polypro series, HI-ZEX series, NEO-ZEX series, and ULTZEX series manufactured by Prime Polymer Co., Ltd.

The content of the polyolefin-based resin (c) is 0 parts by mass or more, preferably 2 parts by mass or more, more preferably 4 parts by mass or more, particularly preferably 5 parts by mass or more, and preferably 50 parts by mass or less, more preferably 20 parts by mass or less, particularly preferably 15 parts by mass or less, based on 100 parts by mass of the thermoplastic elastomer (a) in the perforated sheet.

<Additive (d)>

In one embodiment of the present invention, the perforated sheet in the present invention may contain an additive (d) as necessary. The additive (d) may be used singly or in combination of two or more kinds thereof.

Examples of the additive (d) include flaky inorganic additives such as clay, diatomaceous earth, silica, talc, barium sulfate, calcium carbonate, magnesium carbonate, metal oxides, mica, graphite, and aluminum hydroxide; granular or powdery solid fillers such as various metal powders, wood pieces, glass powders, ceramic powders, granular or powdery polymers; and various other natural or artificial staple fibers and filaments (such as straw, hair, glass fiber, metal fiber, various other polymer fibers, and the like).

From the viewpoint of weight reduction of the damping laminate, a hollow filler, such as an inorganic hollow filler such as glass balloons and silica balloons and an organic hollow filler composed of polyvinylidene fluoride, a polyvinylidene fluoride copolymer, or the like, may be added.

Furthermore, the perforated sheet may contain various antiblocking agents, heat stabilizers, antioxidants, light stabilizers, ultraviolet absorbers, lubricants, crystal nucleating agents, foaming agents, colorants, flame retardants, and the like depending on the intended use.

Examples of the antioxidant include phenolic antioxidants such as 2,6-di-tert-butyl-p-cresol, 2,6-di-tert-butylphenol, 2,4-dimethyl-6-tert-butylphenol, 4,4'-dihydroxydiphenyl, tris(2-methyl-4-hydroxy-5-tert-butylphenyl)butane, tetrakis[methylene-3-(3,5-di-tert-butyl-4-hydroxyphenyl)propionate]methane, and 3,9-bis(2-[3-(3-tert-butyl-4-hydroxy-5-methylphenyl)propionyloxy]-1,1-dimethylethyl)-2,4,8,10-tetraoxaspiro-5,5-undecane, phosphite antioxidants, and thioether antioxidants. Among them, phenolic antioxidants and phosphite antioxidants are particularly preferable. The content of the antioxidant is preferably 0.01 to 3 parts by mass, more preferably 0.05 to 1 part by mass, based on 100 parts by mass of a total of the components (a) to (c) contained in the perforated sheet in the present invention.

The flame retardant is not particularly limited, and one or two or more of various flame retardant additives (such as an organic phosphorus-containing compound, an inorganic phosphorus-containing compound, an organic halogen-containing compound, an inorganic halogen-containing compound, an organic phosphorus-halogen-containing compound, an inorganic phosphorus-halogen-containing compound, antimony oxide, titanium oxide, a metal hydroxide, and a water-containing inorganic crystalline compound) conventionally used may be used. Among them, a phosphorus flame retardant containing no halogen is preferable, and examples thereof include red phosphorus, an organic phosphate ester compound, a phosphazene compound, and a phosphoramide compound. An aromatic condensed phosphate ester compound is more preferable.

In the present invention, it is extremely important that the thermoplastic elastomer sheet has a plurality of through holes. The present inventors have found that by laminating such a perforated sheet and a fiber-reinforced resin layer, extremely high damping performance is provided in addition to excellent interlayer adhesiveness and excellent rigidity. Such an effect cannot be achieved in a textile product (such as woven, knitted, and nonwoven fabrics) or synthetic pulp paper (hereinafter the textile product and the synthetic pulp paper may be collectively referred to as a "textile product" for convenience) that does not have a plurality of through holes and is produced using thermoplastic elastomer fiber, and the perforated sheet in the present invention is different from such a textile product. The action mechanism (reason) in which the thermoplastic elastomer sheet having a plurality of through holes brings about extremely high damping performance in addition to excellent interlayer adhesiveness and excellent rigidity in a laminate with the fiber-reinforced resin layer is not clear, but the following is presumed as a non-limiting action mechanism. When the thermoplastic elastomer sheet and a prepreg that provides the fiber-reinforced resin layer are laminated, both are stacked on each other, and then the stack is usually heated while pressure is applied. By heating, the thermoplastic elastomer contained in the thermoplastic elastomer sheet and the thermosetting resin contained in the prepreg are melted and mixed with each other. In the case of the perforated sheet, it is presumed that the thermoplastic elastomer and the thermosetting resin are mixed with each other while maintaining a state of being each aggregated to some extent, the thermoplastic elastomer is present in an aggregated state to some extent even after the thermosetting resin is cured, and the interface between the thermoplastic elastomer and the thermoset resin is not in a firmly bonded (combined) state, so that the thermoplastic elastomer is easily deformed to exhibit extremely good damping performance in the resulting laminate. On the other hand, in the case of a textile product not having a plurality of through holes, it is presumed that, since fibers constituting the textile product are thin, the thermoplastic elastomer and the thermosetting resin are mixed more finely and randomly, and the degree of freedom of deformation of the thermoplastic elastomer is reduced after curing of the thermosetting resin, so that lower damping performance is exhibited in the resulting laminate. In both the case of the perforated sheet and the case of the textile product not having through holes, it can be considered that the thermosetting resin in the semi-cured state flows into the through holes in the former case or flows into the fine gaps of the textile product in the latter case and is cured through the subsequent heat treatment, thereby providing excellent interlayer adhesiveness and rigidity. On the other hand, it was unexpected that there is a significant difference in damping performance between the perforated sheet and the textile product not having through holes.

Examples of the sheet having a plurality of through holes include what is called a pierced sheet and a porous sheet. Examples of the pierced sheet include a film (or sheet) in which holes are provided in a film without holes by punching or the like. Examples of the porous sheet include a porous membrane having a relatively large pore diameter. In any case, it is important that there are a plurality of holes penetrating the sheet and that the whole or most (preferably half or more, more preferably ¾ or more) of the width of the thermoplastic elastomer between the through holes is not as narrow as the fiber diameter (such as 100 μm or less) constituting the textile product. In addition, the size of the holes is preferably uniform. Among these sheets each having a plurality of through holes, a pierced sheet is more preferable for achieving the object of the present invention. The thickness of the perforated sheet in the present invention, particularly the pierced sheet, is preferably 100 μm to 3 mm, more preferably 200 μm to 1 mm.

The opening ratio of the perforated sheet is preferably 5% or more, more preferably 10% or more, particularly preferably 20% or more, and is preferably 80% or less, more preferably 70% or less, particularly preferably 60% or less. The opening ratio can be determined according to the measurement described in the EXAMPLES section described later. When the opening ratio is the lower limit value or more and the upper limit value or less, it is easy to obtain better interlayer adhesion strength and better damping performance.

The average through hole diameter of the perforated sheet is preferably 50 μm or more, more preferably 70 μm or more, particularly preferably 80 μm or more, and is preferably 6,000 μm or less, more preferably 5,500 μm or less, particularly preferably 5,000 μm or less. The average through hole diameter means an average value of the shortest diameter and the longest diameter of the holes. When the average through hole diameter is the lower limit value or more and the upper limit value or less, it is easy to obtain better interlayer adhesion strength and better damping performance. The average through hole diameter can be determined according to the measurement described in the EXAMPLES section described later.

The through hole density of the perforated sheet is preferably 1 hole/cm$^2$ or more, more preferably 2 holes/cm$^2$ or more, particularly preferably 3 holes/cm$^2$ or more, and is preferably 80 holes/cm$^2$ or less, more preferably 75 holes/cm$^2$ or less, particularly preferably 70 holes/cm$^2$ or less. When the average through hole diameter is the lower limit value or more and the upper limit value or less, it is easy to obtain better interlayer adhesion strength and better damping performance. The through hole density can be determined according to the measurement described in the EXAMPLES section described later.

The method for producing the perforated sheet is not particularly limited. For example, a thermoplastic elastomer resin composition is prepared, and a perforated sheet can be produced from the prepared thermoplastic elastomer resin composition.

The thermoplastic elastomer resin composition may be prepared by a conventional publicly-known method and can be prepared, for example, using a melt-kneading machine such as a single screw extruder, a twin screw extruder, a Banbury mixer, a heating roller, or various kneaders. The set temperature of the melt-kneading machine may be appropriately selected according to the components contained in the thermoplastic elastomer resin composition. Usually, the temperature is 150° C. to 300° C.

Examples of the method for producing a perforated sheet from the prepared thermoplastic elastomer resin composition include a method of extruding the thermoplastic elastomer resin composition onto a roller having projections and depressions, and a method of providing holes by punching or the like in a film obtained by extruding the thermoplastic elastomer resin composition. Further, a desired perforated sheet can also be produced by a method for producing a porous separation membrane. Among these methods, in particular, a method (hereinafter also referred to as a "punching method") of forming holes by punching in a film obtained by extruding a thermoplastic elastomer resin composition is more preferable for achieving the object of the present invention.

Examples of the method for obtaining a perforated sheet by the punching method include a method of producing a film from a thermoplastic elastomer resin composition and obtaining a perforated sheet by various punching methods, and a method of producing a textile product (woven, knitted, or nonwoven fabric) or synthetic pulp paper from a thermoplastic elastomer resin composition and obtaining a perforated sheet by various punching methods.

(Fiber-Reinforced Resin Layer)

The damping laminate of the present invention comprises the fiber-reinforced resin layer disposed on one side or each of both sides of the perforated sheet.

The damping laminate can be produced, for example, by placing, on one surface or both surfaces of the perforated sheet, a prepreg produced by uniformly impregnating a reinforcing material composed of reinforcing fiber with a thermosetting resin composition and heating or drying the thermosetting resin composition to a semi-cured state, and heating the stack while applying pressure to cure the thermosetting resin. The pressure may be applied by pressurizing the stack of the prepreg and the perforated sheet with a press or the like, or by putting the stack of the prepreg and the perforated sheet in a pouch, a bag, or the like or covering the stack with a film or the like so as not to form a gap and depressurizing the interior.

The reinforcing fiber is not particularly limited, and examples thereof include carbon fiber, silica fiber, glass fiber, aramid fiber, boron fiber, alumina fiber, and silicon carbide fiber. These fibers may be used singly or in combination of two or more kinds thereof. From the viewpoint of easily obtaining a damping laminate having higher rigidity, the reinforcing fiber is preferably one or more fibers selected from the group consisting of carbon fiber, silica fiber, and glass fiber, and from the viewpoint of lightweight properties, the reinforcing fiber is more preferably carbon fiber.

Examples of the thermosetting resin include epoxy resins, unsaturated polyesters, vinyl ester resins, phenolic resins, cyanate ester resins, and polyimides. Among them, an epoxy resin is preferable from the viewpoint of adhesiveness.

The thermosetting resin composition usually contains a curing agent. As such a curing agent, a general curing agent corresponding to the thermosetting resin contained in the thermosetting resin composition may be used. The thermosetting resin composition may also contain any commonly used additive as necessary, and examples thereof include thermoplastic resins such as polyamides, polycarbonates, polyphenylene sulfide, and polyether ether ketone, a curing catalyst, and a liquid rubber.

For the preparation of the thermosetting resin composition, for example, a melt kneader such as a single screw extruder, a twin screw extruder, a Banbury mixer, a heating roller, and various kneaders may be used, or a beaker and a spatula or the like may be used as long as uniform kneading is possible.

Examples of the method for uniformly impregnating a reinforcing material (such as a unidirectional reinforcing fiber sheet formed by aligning reinforcing fiber in one direction and forming the fiber into a sheet shape, a woven fabric, and paper) made of reinforcing fiber with the thermosetting resin composition include a hot melt method (dry method). The hot melt method is a method in which a reinforcing material is directly impregnated with a thermosetting resin composition whose viscosity has been reduced by heating, or a method in which a film obtained by coating a release paper or the like with a thermosetting resin composition is produced, the film is then stacked on both or one side of the reinforcing material, and the reinforcing material is impregnated with the resin composition by heating the stack while applying pressure. Conditions for pressure application and heating may be appropriately selected according to components contained in the thermosetting resin composition. The prepreg can be produced by performing drying or semi-curing after or simultaneously with impregnation.

The thickness of the prepreg may be appropriately selected according to the intended use. The thickness of one prepreg is usually 30 to 300 μm. One prepreg can be used, or a plurality of prepregs can be used in a stacked form depending on the intended use.

A commercially available prepreg may be used in the production of the damping laminate of the present invention, and examples of such a commercially available product include TORAYCA (registered trademark) prepregs.

[Damping Laminate]

The damping laminate can be produced by disposing the prepreg on one surface or each of both surfaces of the perforated sheet and heating the stack while applying pressure. Conditions for pressure application and heating may be appropriately selected according to the type of the thermosetting resin contained in the prepreg, the type of the thermoplastic elastomer (a) contained in the perforated sheet, and the like. Usually, pressure application and heating are performed at 0.1 to 0.5 MPa and 120° C. to 220° C. for 0.5 to 8 hours.

The ratio between the thickness of the perforated sheet and the thickness of the prepreg in the laminate (thickness of perforated sheet/thickness of prepreg) may be appropriately selected according to the intended use. The ratio is usually ⅕ to ½. When the prepreg is present on both sides of the perforated sheet, the thickness of the prepreg is the total thickness of the prepreg.

The damping laminate of the present invention has excellent interlayer adhesion. The interlayer adhesion can be evaluated using the adhesive strength, and the adhesive strength can be measured by the method described in the EXAMPLES section described later.

The damping laminate of the present invention also has excellent rigidity. The rigidity can be evaluated using the flexural modulus, and the flexural modulus can be measured by the method described in the EXAMPLES section described later. The flexural modulus is preferably 30 MPa or more, more preferably 40 MPa or more, still more preferably 50 MPa or more.

The damping laminate of the present invention also has extremely good damping performance, and thus the loss factor $\eta$ at 1,000 Hz of the damping laminate is 0.016 or more. The loss factor $\eta$ is preferably 0.020 or more, preferably 0.030 or more, more preferably 0.050 or more, particularly preferably 0.100 or more.

The loss factor $\eta$ can be measured by the method described in the EXAMPLES section described later. The upper limit of the loss factor $\eta$ is not particularly limited.

The damping laminate of the present invention can be used singly or in combination of two or more in a stacked form depending on the intended use.

EXAMPLES

The present invention will be specifically described below with reference to Examples, but the present invention is not limited to these Examples at all. The evaluations in the following Examples and Comparative Examples were performed by the following methods.

(1) Glass Transition Temperature (Tg)

The glass transition temperature of the copolymer block contained in the thermoplastic elastomer was measured by taking part of pellets of the thermoplastic elastomer and using a differential thermal scanning calorimeter ("TA-4000" manufactured by Mettler-Toledo International Inc.) at a heating rate of 10° C./min.

(2) Content of 1,2-Bond and 3,4-Bond Units (Vinyl Bond Content)

The thermoplastic elastomer was dissolved in $CDCl_3$, and $^1$H-NMR measurement was performed (apparatus: JNM-Lambda 500 manufactured by JEOL Ltd., measurement temperature: 50° C.). From the ratio between the total peak area of the structural unit derived from isoprene, the structural unit derived from butadiene, or the structural unit derived from a mixture of isoprene and butadiene and the peak areas corresponding to the 1,2-bond unit and the 3,4-bond unit in the structural unit of isoprene, the 1,2-bond unit and the 3,4-bond unit in the structural unit of butadiene, or the respective bond units in the case of a mixture of isoprene and butadiene, the vinyl bond content (the sum of the contents of the 1,2-bond unit and the 3,4-bond unit) was calculated.

(3) Peak Temperature of Tan δ

The loss factor (tan δ) of a perforated sheet, a woven fabric, a nonwoven fabric, or a film was determined by using a dynamic viscoelasticity measuring apparatus under the following measurement conditions, and the peak temperature of tan δ was read from the obtained graph.

Measuring apparatus: Rheogel-E4000
Measurement method: dynamic viscoelastic modulus measurement (sine wave)
Measurement mode: temperature-dependent
Chuck: pulled
Frequency: 30 Hz
Measurement temperature: 23° C.
Sample dimensions: 4.90 mm in width, 0.3 mm in thickness, 20 mm in length (4) Weight Average Molecular Weight The weight average molecular weight of the thermoplastic elastomer was determined by performing GPC measurement under the following measurement conditions and converting the obtained value into a value in terms of standard polystyrene.

GPC: LC Solution (manufactured by Shimadzu Corporation)
Detector differential refractometer RID-10A (manufactured by Shimadzu Corporation)
Column: two TSKgel G4000Hx1 columns in series (manufactured by Tosoh Corporation)
Guard column: TSKguardcolumn Hxl-L (manufactured by Tosoh Corporation)
Solvent: tetrahydrofuran
Temperature: 40° C.
Flow rate: 1 mL/min
Concentration: 2 mg/mL (5) Opening Ratio A perforated sheet measuring 10 cm×10 cm was copied to A4-size copy paper at a magnification of 400% using a copying machine (IPSio0 SP 6310 RPCS type manufactured by Ricoh Co., Ltd.). Next, a portion other than the copied perforated sheet was cut and removed from the copy paper, and the mass of the copy paper (corresponding to the mass of the thermoplastic elastomer sheet having no through hole) ($W_1$ [g]) was measured. Subsequently, all portions corresponding to the through hole portions were cut out from the copy paper for which WE had been measured, and the mass (corresponding to the mass of the thermoplastic elastomer removed by the penetration when the through holes are provided in the thermoplastic elastomer sheet having no through hole) ($W_2$ [g]) of the cutouts of the copy paper was measured. The opening ratio (%) was calculated according to the following equation.

Opening ratio (%)=$(W_2/W_1)\times 100$ (6) Average Through Hole Diameter

For each through hole included in an arbitrary region measuring 1 cm×1 cm of the perforated sheet, the shortest diameter and the longest diameter were each measured with a vernier caliper, and the average value thereof was calculated. When part of a through hole exists in the peripheral edge portion of the region, such a part of the through hole is not included in the through holes for which the shortest diameter and the longest diameter are measured.

(7) Through Hole Density

The number of through holes included in an arbitrary region measuring 1 cm×1 cm of the perforated sheet was visually counted. When part of a through hole exists in the peripheral edge portion of the region, the through hole is counted as a number of through holes corresponding to the area of the part. For example, when part of a circular through hole exists in the peripheral edge portion of the region to have a semicircular shape, the semicircular part is counted as ½ through-hole.

(8) Adhesive Strength

The fracture surface at the time of measuring the flexural modulus was visually observed, and whether the fracture was material fracture of the thermoplastic elastomer or delamination between the thermoplastic elastomer sheet and the fiber-reinforced resin layer was confirmed.

(9) Flexural Modulus

In accordance with JIS K 7074, the flexural modulus was measured using a test piece having a length of 100 mm, a width of 10 mm, and a thickness of 1 mm.

(10) Loss Factor η

On the basis of JIS K 7391, the loss factor was calculated by the half-power bandwidth method from a peak of a frequency response function measured by the central exciting method. A system including an oscillator of Type 3160, an amplifier of Type 2718, an exciter of Type 4810, and an acceleration sensor of Type 8001 (all manufactured by Brueel & Kjaer Gmbl) was used, and loss factor measurement software MS 18143 was used. The measurement environment was controlled in a thermostatic bath (PU-3J manufactured by ESPEC CORPORATION), and the measurement was performed at 23° C. The higher the loss factor is, the faster the damping of vibration is, and the higher the damping performance is.

Preparation of Thermoplastic Elastomer (a)

Thermoplastic elastomers (a-1) to (a-3) were prepared as the thermoplastic elastomer (a) by the following method.

Thermoplastic elastomer (a-1): hydrogenated product of styrene-isoprene-styrene triblock copolymer Into a pressure-resistant container that had been purged with nitrogen and dried, 64 L of cyclohexane as a solvent and 0.20 L of sec-butyllithium (10-mass % cyclohexane solution) as a polymerization initiator were introduced, and 0.3 L (equivalent to 15 times in stoichiometric ratio with respect to lithium atoms in polymerization initiator) of THF as an organic Lewis base was added thereto. After the temperature was raised to 50° C., 2.3 L of styrene was added to carry out polymerization for 3 hours, then 23 L of isoprene was added to carry out polymerization for 4 hours, and 2.3 L of styrene was further added to carry out polymerization for 3 hours. The resulting reaction solution was poured into 80 L of methanol, and the precipitated solid was collected by filtration and dried at 50° C. for 20 hours to obtain a triblock copolymer composed of polystyrene-polyisoprene-polystyrene.

In 200 L of cyclohexane, 10 kg of the obtained triblock copolymer was dissolved, palladium carbon (supported amount of palladium: 5 mass %) as a hydrogenation catalyst was added in an amount of 5 mass % with respect to the copolymer, and the reaction was carried out under the conditions of a hydrogen pressure of 2 MPa and 150° C. for 10 hours. After allowing the product to stand to cool and releasing the pressure, palladium carbon was removed by filtration, and the filtrate was concentrated and vacuum-dried to obtain a hydrogenated product of the triblock copolymer composed of polystyrene-polyisoprene-polystyrene.

The characteristics of the obtained hydrogenated product were as follows.

Weight average molecular weight: 100,000
Content of structural unit derived from isoprene: 80 mass %
Content of structural unit derived from styrene: 20 mass %
Content of 3,4-bond unit and 1,2-bond unit of structural unit derived from isoprene: 60 mol %

Thermoplastic elastomer (a-2): hydrogenated product of styrene-isoprene/butadiene-styrene triblock copolymer A hydrogenated product of a styrene-isoprene/butadiene-styrene triblock copolymer was obtained in the same manner as the thermoplastic elastomer (a-1) except that the amount of sec-butyllithium as a polymerization initiator was changed to 0.18 L, and 2.2 L of styrene, a mixed liquid of 6.6 L of isoprene and 7.5 L of 1,3-butadiene, and 2.2 L of styrene were used as monomers to be polymerized.

The characteristics of the obtained hydrogenated product were as follows.

Weight average molecular weight: 90,000
Content of structural units derived from isoprene and butadiene: 70 mass %
Content of structural unit derived from styrene: 30 mass %
Content of 3,4-bond unit and 1,2-bond unit of structural units derived from isoprene and butadiene: S mol %

Thermoplastic elastomer (a-3): hydrogenated product of styrene-butadiene-styrene triblock copolymer into a pressure-resistant container that had been purged with nitrogen and dried, 55.8 kg of cyclohexane as a solvent and 59 mL of sec-butyllithium (10-mass % cyclohexane solution) as a polymerization initiator were introduced, and 99 g of N,N,N',N'-tetramethylethylenediamine as an organic Lewis base was added thereto.

Subsequently, a hydrogenated product of a polystyrene-polybutadiene-polystyrene triblock copolymer was obtained in the same manner as the thermoplastic elastomer (a-1) except that 1.84 kg of styrene, 8.57 kg of butadiene, and 1.84 kg of styrene were used as monomers to be polymerized, and the hydrogenation reaction time was changed to 5 hours.

The characteristics of the obtained hydrogenated product were as follows.

Weight average molecular weight: 280,000
Content of structural unit derived from butadiene: 66 mass %
Content of structural unit derived from styrene: 34 mass %
Content of 3,4-bond unit and 1,2-bond unit of structural unit derived from butadiene: 33 mol %

Hydrocarbon-Based Softener (b)
  Hydrocarbon-based softener (b-1)
    Diana Process Oil PW-380 (trade name), manufactured by Idemitsu Petrochemical Co., Ltd., paraffinic oil, kinematic viscosity (40° C.): 381.6 mm$^2$/s, ring analysis paraffin: 73%, ring analysis naphthene: 27%, weight average molecular weight: 1,304
  Hydrocarbon-based softener (b-2)
    Diana Process Oil PW-90 (trade name), manufactured by Idemitsu Petrochemical Co., Ltd., paraffinic oil, kinematic viscosity (40° C.): 95.5 mm$^2$/s, ring analysis paraffin: 71%, ring analysis naphthene: 29%, weight average molecular weight: 790

Polyolefin-Based Polymer (c)
  Polyolefin-based polymer (c-1) Polypropylene: Prime Polypro P219DA (trade name), manufactured by Prime Polymer Co., Ltd., MFR (230° C.): 8.0 g/10 min
  Polyolefin-based polymer (c-2)
    Polypropylene: Prime Polypro J108M (trade name), manufactured by Prime Polymer Co., Ltd., MFR (230° C.): 45 g/10 min Production of Prepreg An epoxy resin composition was applied onto release paper using a reverse roll coater to produce a resin film. Next, carbon fibers "TORAYCA (registered trademark)" T800SC-24K (manufactured by Toray Industries, Inc., tensile modulus: 294 GPa, tensile strength: 5,880 MPa) aligned in one direction in a sheet shape were disposed on the produced resin film, and another produced resin film was further overlaid thereon. The carbon fibers were impregnated with the epoxy resin composition by heating while applying pressure with a press to produce a unidirectional prepreg. The unidirectional prepreg had a carbon fiber mass per unit area of 125 g/m$^2$, a fiber mass content of 75 mass %, and a thickness of 100 μm.

Production of Laminated Prepreg

A 5-ply laminated prepreg was produced by stacking 5 sheets of the produced unidirectional prepreg so that the fiber directions alternately form right angles, and heating them at 200° C. and 0.5 MPa for 3 minutes while applying pressure with a press.

Examples 1 to 4

Components were mixed according to the formulation described in Table 1 described later and then melt-kneaded at 190° C. using a twin screw extruder (diameter: 46 mm, U)=46) to obtain a pellet-shaped thermoplastic elastomer resin composition. The obtained thermoplastic elastomer resin composition was discharged under the condition of a nozzle temperature of 200° C. to obtain a film having a thickness of 300 m. The obtained film was punched to obtain a thermoplastic elastomer sheet having a plurality of through holes. The obtained perforated sheet was disposed between two 5-ply laminated prepregs and stacked, and the stacked sheets were covered with a nylon film without any gap. The product was heated in an autoclave at 135° C. and an internal pressure of the autoclave of 588 kPa for 2 hours to cure the epoxy resin, thereby producing a damping laminate.

Example 5

A damping laminate was produced in the same manner as in Example 2 except that the carbon fibers of the prepreg were changed to glass fibers ("RS110 QL-520" (trade name) manufactured by Nitto Boseki Co., Ltd.).

Comparative Example 1

A damping laminate was obtained in the same manner as in Example 1 except that a woven fabric (weight per unit area: 52 g/m²=weight per unit area of Example 1 of JP-A-2015-193751, thickness: 300 μm) obtained by weaving fibers made of a thermoplastic elastomer prepared according to the formulation shown in Table 1 was used instead of the perforated sheet.

Comparative Example 2

A damping laminate was obtained in the same manner as in Example 1 except that a nonwoven fabric (weight per unit area: 80 g/m², thickness; 400 μm) produced using fibers made of a thermoplastic elastomer prepared according to the formulation shown in Table 1 was used instead of the perforated sheet.

Comparative Example 3

A damping laminate was obtained in the same manner as in Example 1 except that a film with a thickness of 0.2 mm made of a thermoplastic elastomer prepared according to the formulation shown in Table 1 was used instead of the perforated sheet.

Comparative Example 4

Adhesive tape (acrylic adhesive tape having a thickness of 0.1 mm) was attached to both surfaces of the perforated sheet produced in Example 2, and urethane synthetic leather (thickness: 0.7 mm) was attached to one side of the product to obtain a laminate.

The evaluation results of Examples 1 to 5 and Comparative Examples 1 to 4 are shown in Table 1.

TABLE 1

| | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| (a-1) | — | 400 | 400 | — | 400 | 60 | — | 60 | 400 |
| (a-2) | 70 | — | — | 70 | — | — | 70 | — | — |
| (a-3) | 30 | 100 | 100 | 30 | 100 | — | 30 | — | 100 |
| (b-1) | 100 | — | — | 100 | — | — | 100 | — | — |
| (b-2) | — | 60 | 60 | — | 60 | — | — | — | 60 |
| (C-1) | 5 | — | — | — | — | 40 | 5 | 40 | — |
| (C-2) | — | 20 | 20 | — | 20 | — | — | — | 20 |
| Tg (° C.) of copolymer block (A) | −40 | 25 | 25 | −40 | 25 | 0 | −40 | 0 | 25 |
| Peak temperature (° C.) of tan δ | −42 | 20 | 20 | −42 | 20 | 10 | −42 | 10 | 20 |
| Shape | Perforated sheet | Perforated sheet | Perforated sheet | Perforated sheet | Perforated sheet | Fabric | Nonwoven fabric | Film | Perforated sheet |
| Oponiag ratio (%) | 50 | 50 | 20 | 50 | 50 | 0 | 0 | 0 | 50 |
| Average through hole diameter (μm) | 100 | 100 | 3000 | 100 | 100 | — | — | — | 0.1 |
| Through hole density (holes/cm²) | 65 | 65 | 2 | 65 | 65 | 0 | 0 | 0 | 65 |
| Adhesive Strength | Material fracture | Material fracture | Material fracture | Material fracture | Material fracture | Material fracture | Material fracture | Delumination | Material fracture |
| Flexural modulus (MPa) | 58 | 73 | 50 | 60 | 30 | 70 | 82 | 20 | Not measurable (flexible) |
| Loss factor η (—) | 0.034 | 0.162 | 0.201 | 0.037 | 0.160 | 0.010 | 0.015 | 0.071 | Not measurable (flexible) |

From Table 1, it can be seen that the damping laminate of the present invention had high adhesive strength and a high flexural modulus, and an extremely high loss factor. This result shows that the damping laminate of the present invention had extremely good damping performance in addition to excellent interlayer adhesiveness and excellent rigidity. In the damping laminate of the present invention, it is considered that the thermosetting resin in the semi-cured state flows into the through holes and is cured by heat treatment to provide excellent interlayer adhesiveness and rigidity, and while, by using a specific thermoplastic elastomer sheet, the thermoplastic elastomer can exist in a state of being easily deformed in the laminate, and extremely good damping performance is also secured.

On the other hand, in the Comparative Examples using the fabric and the nonwoven fabric, it can be seen that the loss factor is low and the damping performance is poor. In addition, in the Comparative Example using the film, the adhesive strength and the elastic modulus were low, which is considered to be due to poor interfacial adhesion between the film and the epoxy resin. In the Comparative Example in which polyurethane synthetic leather was used instead of the fiber-reinforced resin layer, it is found that the adhesiveness between the polyurethane synthetic leather and the perforated sheet was good, but desired rigidity and damping performance were not obtained.

INDUSTRIAL APPLICABILITY

The damping laminate of the present invention is extremely good in damping performance while having excellent interlayer adhesiveness and excellent rigidity and thus can be suitably used for applications in which high strength, high dimensional accuracy, and high damping performance are required, such as sports goods such as rackets (such as a tennis racket and a badminton racket), skis, and snow boats, and parts or structural materials constituting moving bodies such as automobiles, aircraft, railway vehicles, and ships.

The invention claimed is:

1. A damping laminate, comprising:
   a thermoplastic elastomer sheet comprising a thermoplastic elastomer (a) containing at least one copolymer block (A) with a glass transition temperature of 30° C. or lower, and having a plurality of through holes; and
   a fiber-reinforced resin layer disposed on one surface or each of both surfaces of the thermoplastic elastomer sheet.

2. The damping laminate according to claim 1, wherein the thermoplastic elastomer (a) contains at least one copolymer block (B) containing a structural unit derived from one or more compounds selected from the group consisting of a vinyl aromatic compound, an olefinic compound, a urethane compound, and an ester compound.

3. The damping laminate according to claim 1, wherein the thermoplastic elastomer (a) is a block copolymer composed of at least one copolymer block (A) composed of a structural unit derived from a conjugated diene-based compound and at least two copolymer blocks (B) composed of a structural unit derived from a vinyl aromatic compound, and/or a hydrogenated product of the block copolymer.

4. The damping laminate according to claim 1, wherein the thermoplastic elastomer (a) has a weight average molecular weight of 40,000 or more and 500,000 or less.

5. The damping laminate according to claim 1, wherein based on 100 parts by mass of the thermoplastic elastomer (a) in the thermoplastic elastomer sheet,
   a content of a hydrocarbon-based softener (b) is 10 parts by mass or more and 300 parts by mass or less, and
   a content of a polyolefin-based resin (c) is 50 parts by mass or less.

6. The damping laminate according to claim 1, wherein based on 100 parts by mass of the thermoplastic elastomer (a) in the thermoplastic elastomer sheet,
   a content of a hydrocarbon-based softener (b) is 10 parts by mass or more and 300 parts by mass or less, and
   a content of a polyolefin-based resin (c) is 2 parts by mass or more and 50 parts by mass or less.

7. The damping laminate according to claim 1, wherein the thermoplastic elastomer sheet has an opening ratio of 5% or more and 80% or less.

8. The damping laminate according to claim 1, wherein the thermoplastic elastomer sheet has an average through hole diameter of 50 μm or more and 6,000 μm or less.

9. The damping laminate according to claim 1, wherein the thermoplastic elastomer sheet has a through hole density of 1 hole/cm$^2$ or more and 80 holes/cm$^2$ or less.

10. The damping laminate according to claim 1, wherein the fiber-reinforced resin layer contains one or more types of fiber selected from the group consisting of carbon fiber, silica fiber, glass fiber, aramid fiber, boron fiber, alumina fiber, and silicon carbide fiber.

11. The damping laminate according to claim 1, wherein said thermoplastic elastomer (a) has a peak temperature of tan δ of 60-° C. to 30° C.

12. The damping laminate according to claim 1, wherein said thermoplastic elastomer sheet has a thickness of 100 μm to 3 mm.

13. The damping laminate according to claim 1, wherein a resin of said fiber-reinforced resin layer is a thermoset resin composition.

14. The damping laminate according to claim 1, wherein said damping laminate has a loss factor n of at 1,000 Hz of 0.016 or more.

* * * * *